United States Patent [19]

Harben, Jr. et al.

[11] 3,902,221

[45] Sept. 2, 1975

[54] EVISCERATOR APPARATUS AND METHOD

[75] Inventors: Grover S. Harben, Jr., Gainesville; Kenneth Z. Graham, Dawsonville, both of Ga.

[73] Assignee: Gainesville Machine Company, Inc., Gainesville, Ga.

[22] Filed: Jan. 2, 1974

[21] Appl. No.: 430,209

Related U.S. Application Data

[63] Continuation-in-part of Ser. No. 217,206, Jan. 12, 1972, and a continuation-in-part of Ser. No. 228,962, Feb. 24, 1972, Pat. No. 3,806,988.

[52] U.S. Cl. .................................................. 17/11
[51] Int. Cl. .................................................. A22c
[58] Field of Search .............................. 17/11, 52

[56] References Cited
UNITED STATES PATENTS

| | | | |
|---|---|---|---|
| 3,689,961 | 4/1974 | Scheier | 17/11 |
| 3,802,028 | 9/1972 | Crane | 17/11 |

*Primary Examiner*—Robert Peshock
*Attorney, Agent, or Firm*—B. J. Powell

[57] ABSTRACT

An eviscerating method and apparatus for poultry in which an access opening to their body cavity has been formed at their vent wherein the apparatus includes a conveyor from which shackle members are flexibly suspended to engage and support the poultry by their hocks, a holding member engagable with the poultry at the joints between their legs and body in opposition to the shackle member and spacing means for selectively varying the spacing between the positioning member and the shackle member to support poultry between the shackle member and the holding member so that the access opening is located in a fixed plane while the breast portion of the poultry is flexibly supported in a cantilever fashion through its bone and muscle structure. An eviscerating tool is reciprocally mounted along a straight eviscerating path on a traveling table adjacent the fixed plane in which the access opening is located and extendible through the fixed plane and access opening into the body cavity while the table moves the tool along in alignment with the poultry. The tool is further pivotally mounted on a pivot axis normal to the eviscerating path so that the extending end of the tool can be positioned in the body cavity.

The method of the invention includes the steps of supporting poultry by its hocks and at the joints between its legs and body so as to locate the access opening in a fixed plane while the breast portion of the poultry is flexibly supported therefrom in cantilever fashion through the bone and muscle structure of the poultry. The method also includes inserting an eviscerating tool through the access opening to eviscerate the poultry while it is supported.

25 Claims, 18 Drawing Figures

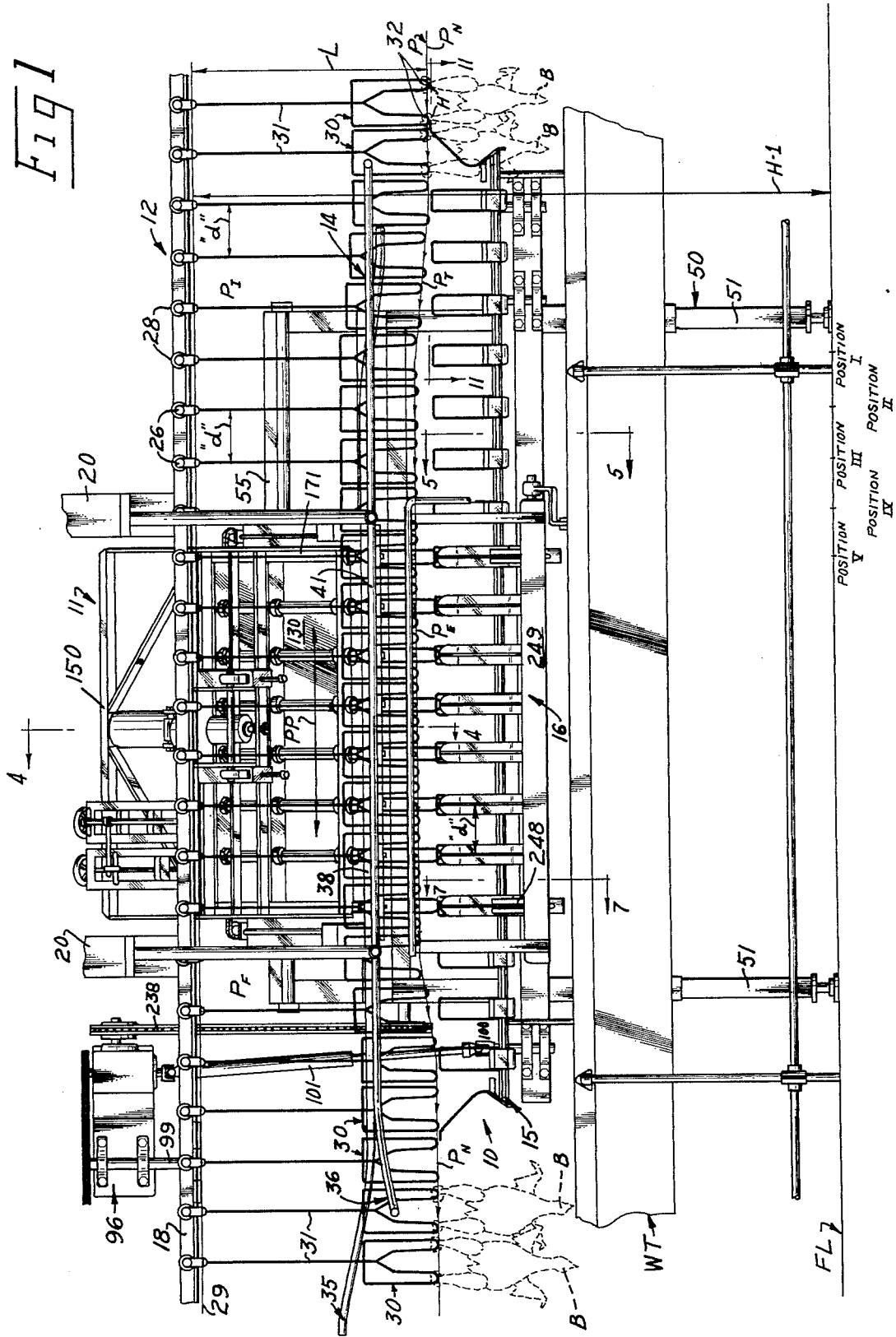

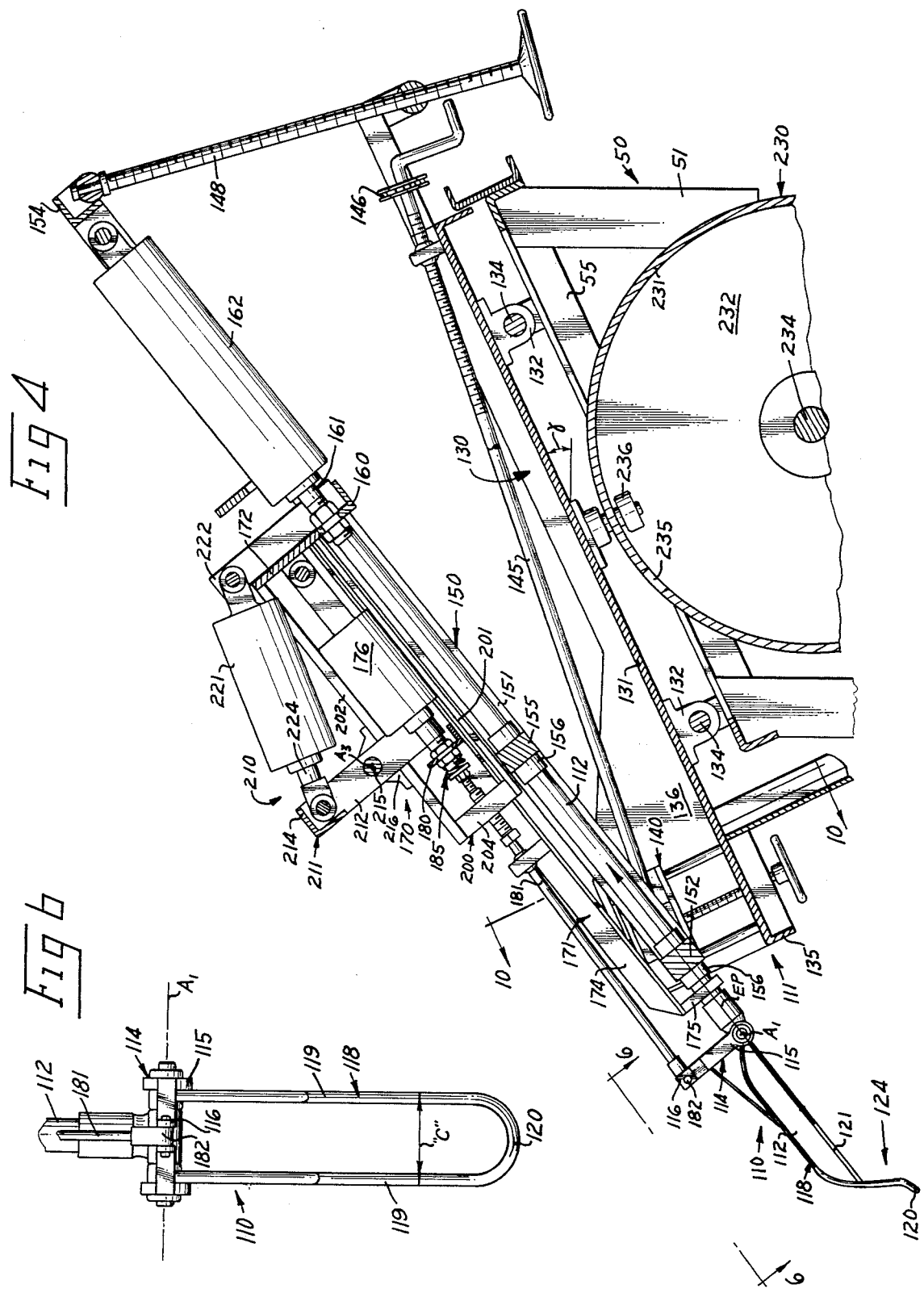

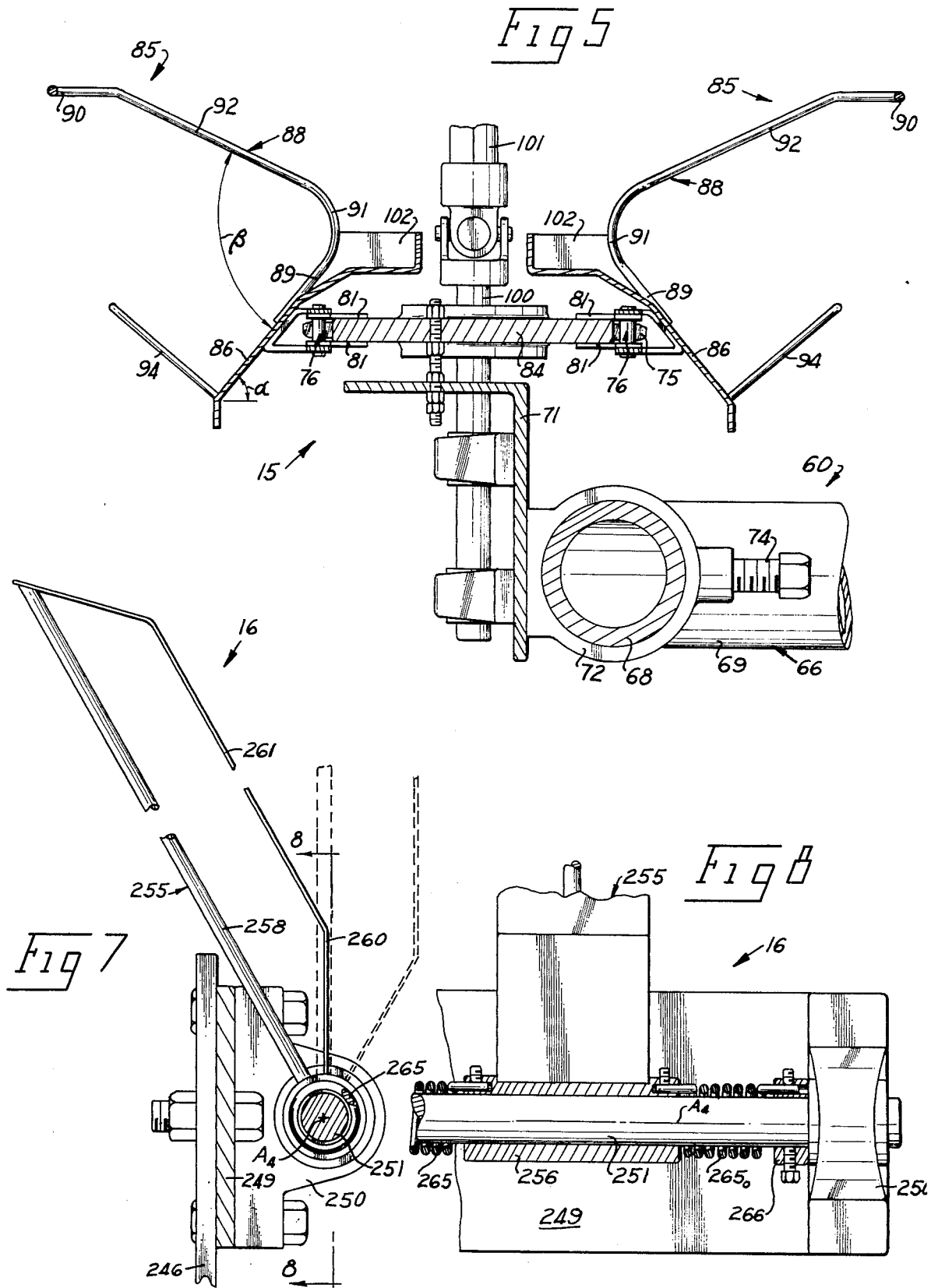

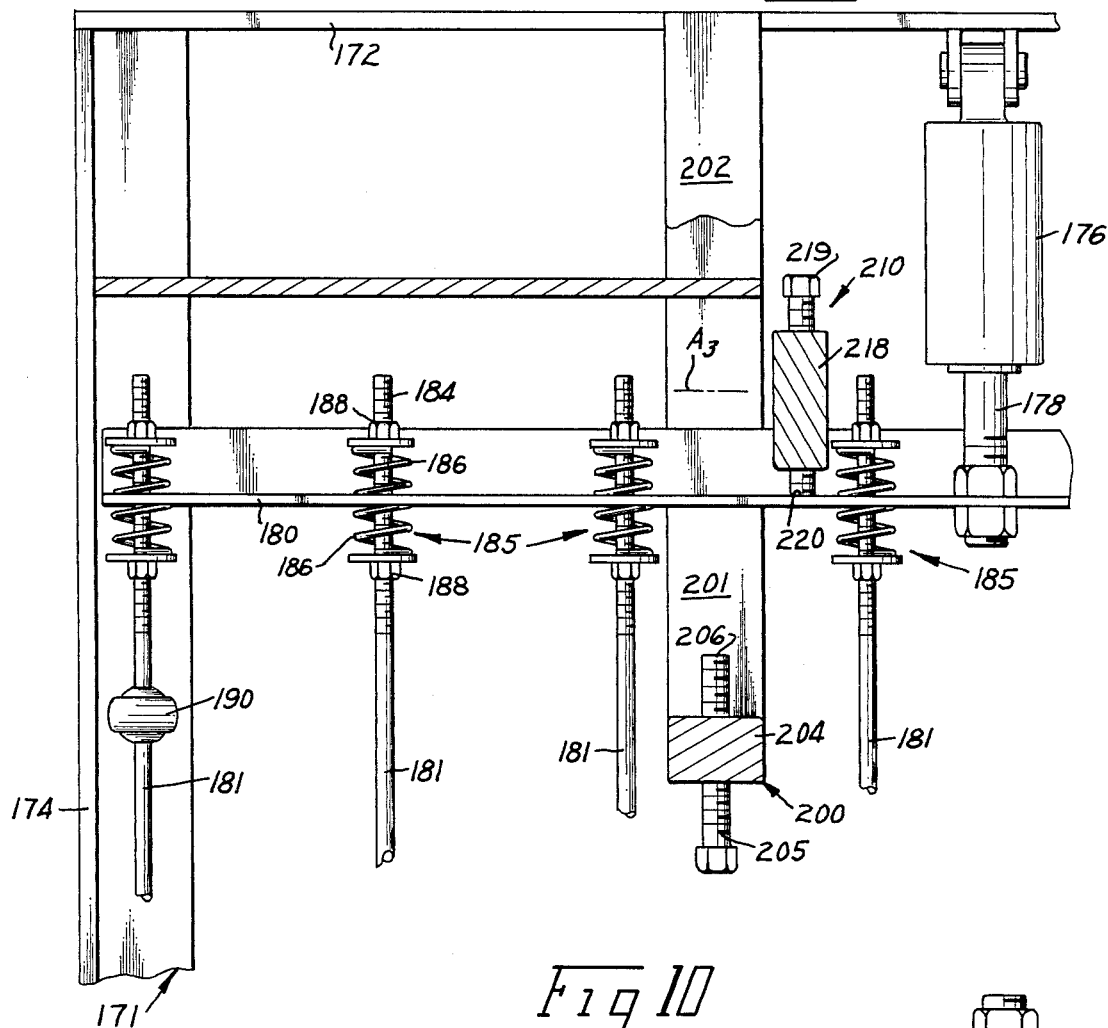
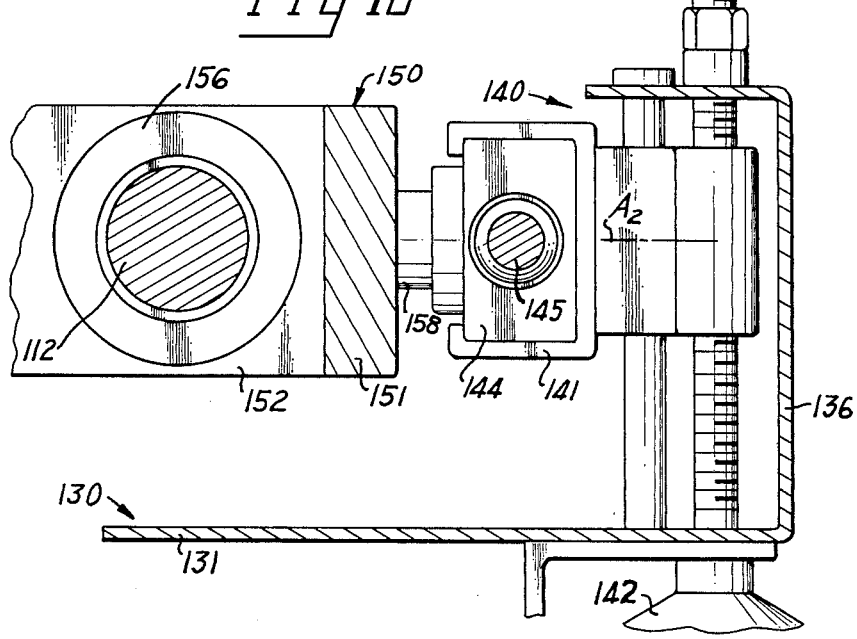

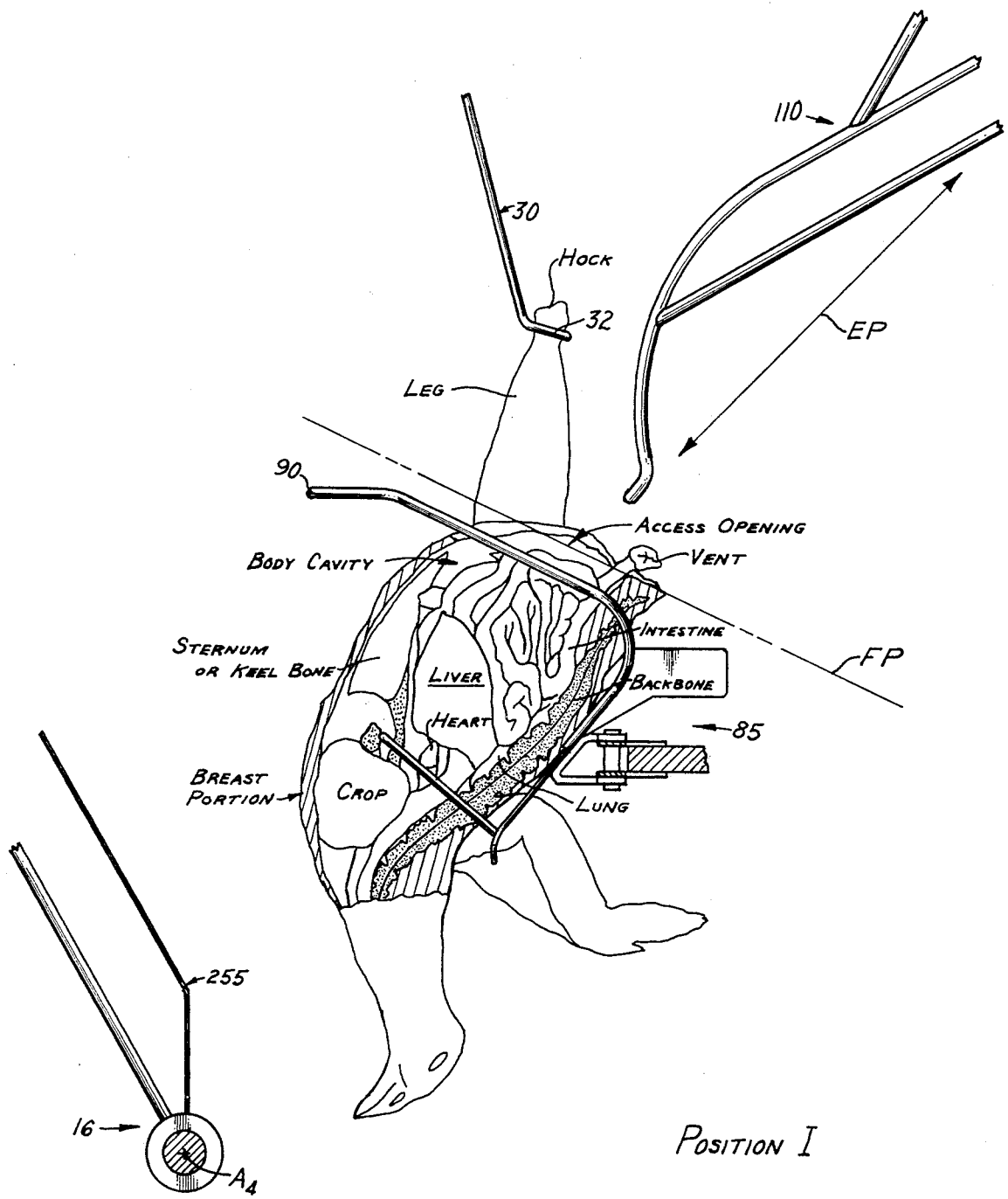

EVISCERATOR APPARATUS AND METHOD

CROSS-REFERENCE TO RELATED APPLICATIONS

This application is a continuation-in-part of co-pending application Ser. No. 217,206, filed Jan. 12, 1972, for "Vacuum Eviscerator Apparatus and Method" and co-pending application Ser. No. 228,962, filed Feb. 24, 1972 and now U.S. Pat. No. 3,806,988 issued Apr. 30, 1974 for "Poultry Processing Method and Apparatus".

BACKGROUND OF THE INVENTION

In the processing of poultry, the viscera must be removed from the carcass to produce an edible product. Because of the variation in bird cavity size and the complex manipulation of the viscera required to remove the same, the eviscerating operation has remained a manual operation until recently. More recently attempts to mechanically eviscerate poultry have been made. However, such attempts have not been adequate in that the relationship of the eviscerating tool with respect to the bird was not sufficiently controlled to insure that the viscera is removed undamaged and the bird itself is not damaged. The major problem with prior art poultry eviscerating systems has been the inability to successfully locate the access opening at the vent of successive birds in the same location so that the eviscerating tool can be properly inserted into the body cavity while at the same time allowing the forward portion of the body (i.e. the breast portion) to move as the tool is inserted into the body cavity and allow the leading edge of the tool to pass along the breast bone and withdraw along the backbone without damage to the carcass. This has resulted in the evisceration of poultry still remaining primarily a manual operation.

SUMMARY OF THE INVENTION

These and other problems and disadvantages associated with the prior art poultry eviscerating apparatus are overcome by the invention disclosed herein by providing means for accurately locating the access opening at the vent of the bird in a fixed eviscerating plane while allowing the breast portion thereof to be resiliently moved with respect to the plane and for mechanically removing the viscera of poultry. Such means performs this operation automatically thus eliminating the manual prior art procedures. Moreover, the invention can be operated at processing plant line speed to eliminate the need for multiple processing lines required by the prior art.

The apparatus for positioning the bird includes an overhead conveyor means having shackle members for supporting and for moving the birds along a prescribed path in a head lowermost position, carcass holding means for engaging the birds at the joints between their legs and body, means for synchronizing the movement between the shackle members and the carcass holding means, and spacing means for selectively varying the distance between the shackle members and the carcass holding means to cause the access opening to be accurately located in a fixed plane while the breast portion of the bird is allowed to be resiliently moved with respect to the access opening during synchronous movement of the shackle member, holding means and bird along the prescribed path.

The apparatus for removing the viscera includes at least one tool for extension into the body cavity of the bird. The tool is reciprocally mounted for movement along a straight eviscerating path generally normal to the prescribed path on a support table which moves along a path generally parallel to the prescribed path synchronously with the shackle member and holding means. The tool is reciprocated as the table is moved so that the tool passes through the access opening. The tool is also pivoted about an axis generally normal to the eviscerating path so that the position of the tool with respect to the body cavity of the bird is accurately controlled. A deflector unit is provided to assist in locating the viscera as the tool is inserted.

The method of the invention includes the steps of accurately locating the access opening at the vent of the bird in a fixed plane while allowing resilient movement of the breast portion of the bird with respect to the vent opening, inserting an eviscerating tool through the access opening into the body cavity of the bird, moving the tool while allowing the access opening and bird to move about the fixed plane to conform to the tool, passing the tool around the viscera, and withdrawing the tool from the access opening pulling the viscera therewith.

These and other features and advantages of the invention will become more fully understood upon consideration of the following detailed description and accompanying drawings wherein like characters of reference designate corresponding parts throughout the several views and in which:

BRIEF DESCRIPTION OF THE DRAWINGS

FIG. 4 is a cross-sectional view taken generally along line 4—4 in FIG. 1;

FIG. 5 is a cross-sectional view taken generally along line 5—5 in FIG. 1;

FIG. 6 is an enlarged view of the eviscerating tool;

FIG. 7 is an enlarged cross-sectional view taken along line 7—7 in FIG. 1;

FIG. 8 is an enlarged cross-sectional view taken along line 8—8 in FIG. 7;

FIG. 9 is an enlarged partial top view of the tool positioning drive assembly;

FIG. 10 is an enlarged cross-sectional view taken generally along line 10—10 in FIG. 4;

FIG. 13 is a view showing the poultry in position for processing;

FIG. 16 is a view similar to FIG. 15 showing the tool fully inserted;

These figures and the following detailed description disclose specific embodiments of the invention, however, it is to be understood that the invention concept is not limited thereto since it may be embodied in other forms.

DETAILED DESCRIPTION OF ILLUSTRATIVE EMBODIMENTS

Figure 2:
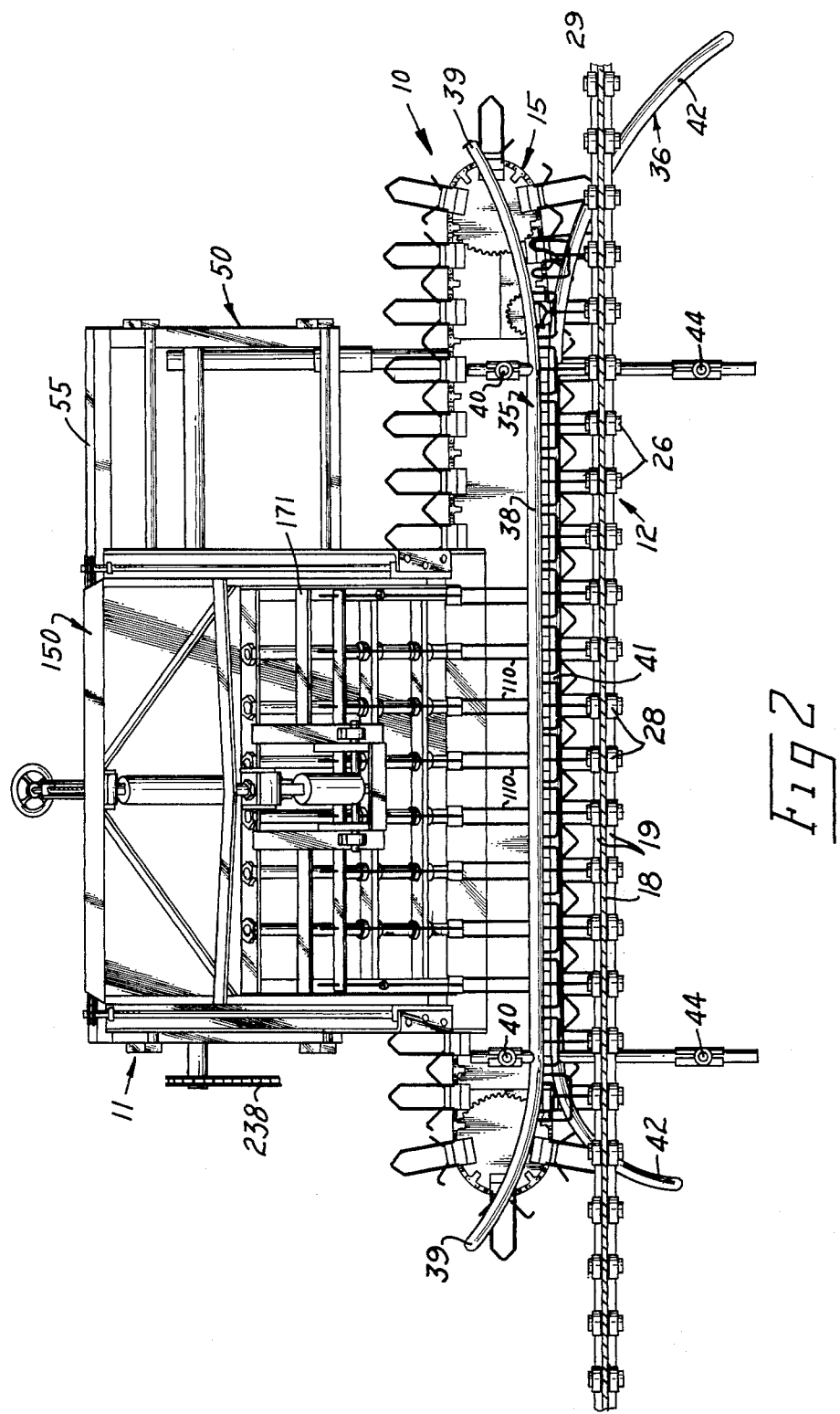
FIG. 2 is a top plan view of the machine of FIG. 1.
Figure 1B:
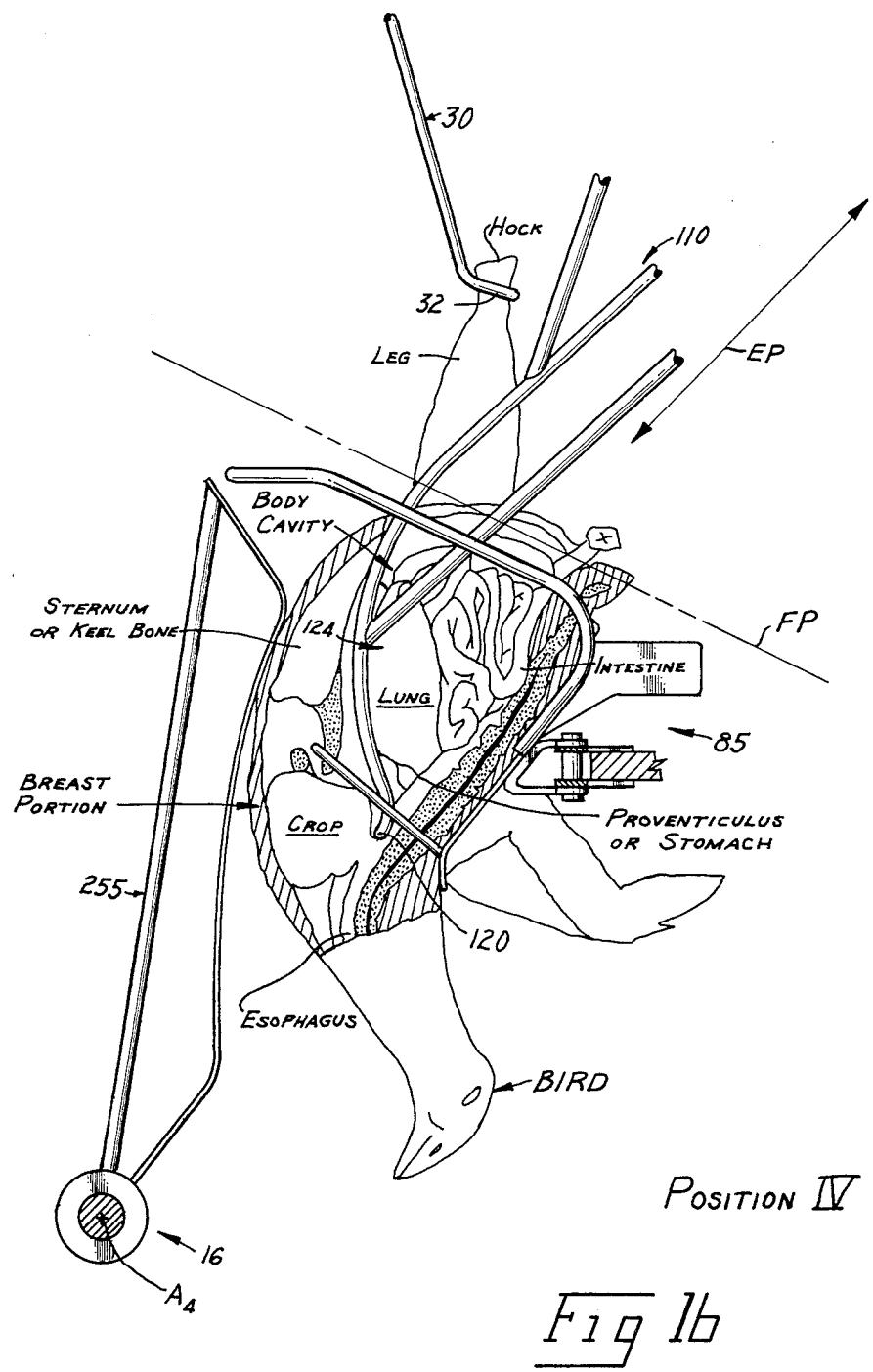
FIG. 1 is a front view of one embodiment of the invention in position on a poultry processing line.

Referring to the figures, the apparatus of the invention includes generally a positioning means 10 and an eviscerating means 11. The positioning means 10 moves the birds B along a prescribed path P as seen in FIGS. 1 and 2 while the eviscerating means removes the viscera from the body cavity of the bird. As the birds B are moved along the prescribed path, the preformed access opening at their vents is moved along a relatively fixed plane while the breast portion of the bird is supported in cantilever fashion through its bone and muscle structure. As the eviscerating means is inserted into the body cavity of the bird through the access opening, the access opening can be moved within the fixed plane to conform with the eviscerating means.

POSITIONING MEANS

The positioning means 10 includes generally an overhead conveyor 12, a guide assembly 14, a holding assembly 15, and a deflector assembly 16. The conveyor 12 is of the overhead type normally associated with poultry processing plants with an overhead inverted T-shaped trolley track 18 having transversely extending support flanges 19 on the lower side thereof. Supports 20 mount the track 18 above the floor level FL of the processing plant. Track 18 is mounted a first prescribed distance H-1 above floor level FL as will become more apparent.

A plurality of trolley assemblies 26 of conventional design are movably mounted on track 18 by their wheels 28 which roll along the upper surface of flanges 19 in known manner. Drive means 29 shown as a drive cable connect the trolley assemblies 26 in known manner to successively move the assemblies 26 along track 16 a predetermined distance "d" apart.

Each trolley assembly 26 flexibly mounts a shackle 30 therebelow suspended on a connector 31. Each shackle 30 is provided with a pair of spaced apart U-shaped hock clamping portions 32 which receive the hocks H of the carcass of bird B and support same through the weight of the bird forcing the hocks into the portions 32. The weight of the bird forces the connector 31 to its most extended length so that the bird B is free to swing about an arcuate plane defined by length L from assembly 26 to the hock engaging portions 32 as it is moved along a prescribed path P to the left as seen in FIG. 1.

Referring to FIGS. 1 and 2, it will be seen that the path P has several subpaths. When shackles 30 hang normally and are not deflected, the path P is generally vertically aligned with the track 18. This subpath of the path is designated $P_N$ in FIGS. 1 and 2 and is that subpath along which the birds move as they approach and leave the holding assembly 15. As the birds B approach the right hand end of the holding assembly 15, the guide assembly 14 deflects the shackles 30 rearwardly and upwardly along the entry transistion subpath $P_T$ of path P as will become more apparent. The shackles 30 are held in this rearwardly and upwardly deflected position as they move along the length of the holding assembly 15 along the eviscerating subpath $P_E$ of path P which is generally parallel to the normal subpath $P_N$ of path P. As the shackles 30 clear the left hand end of the holding assembly 15, the guide assembly 14 releases the shackles 30 to swing back to the normal subpath $P_N$ of path P.

Figure 3:
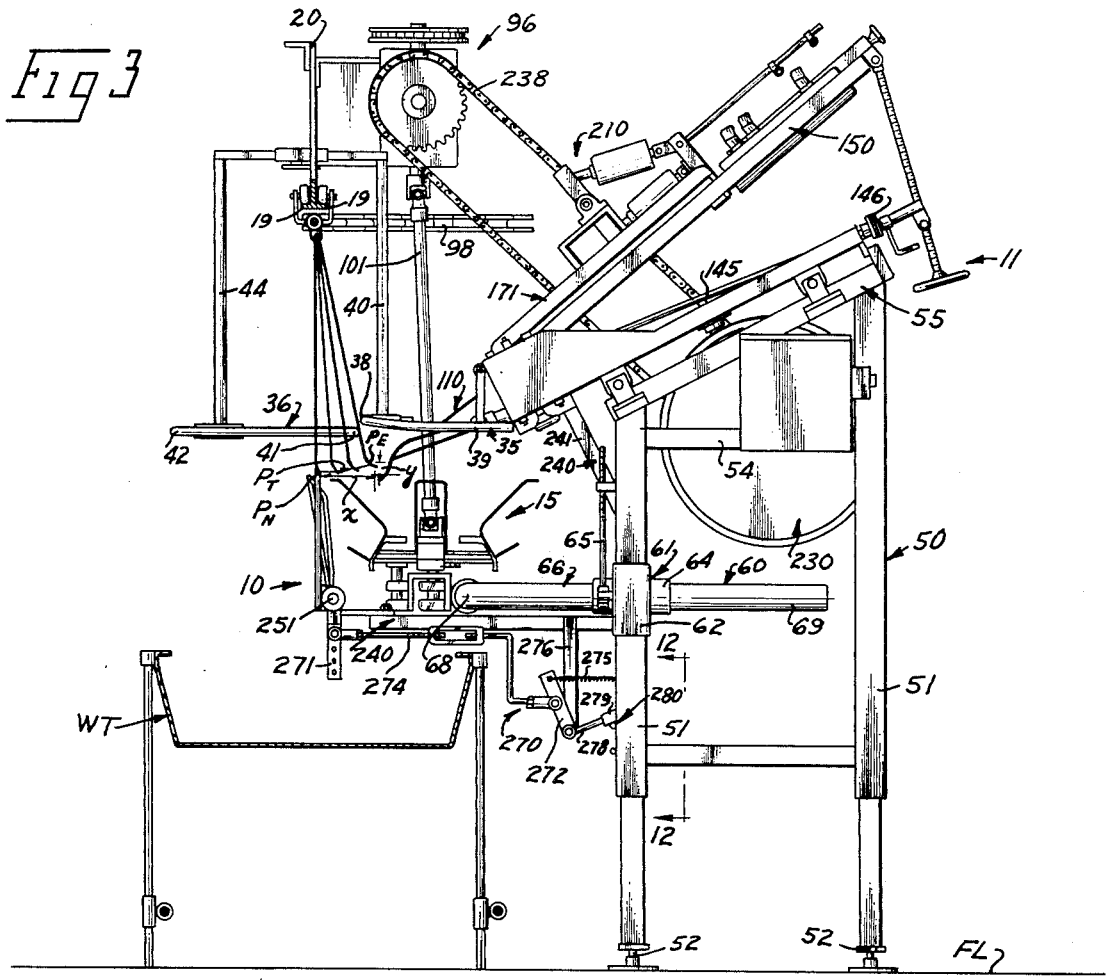
FIG. 3 is an end view of the machine.

The guide assembly 14 includes an upper inside guide rod 35 positioned along the backside of shackle 30 as seen in FIGS. 1 and 2 and a lower outside guide rod 36 positioned in front of shackle members 30 below rod 35. Referring specifically to FIGS. 2 and 3, the rod 35 has a straight central section 38 and rearwardly curved ends 39. The rod 35 is adjustably mounted on supports 40 depending from supports 20 of conveyor 12 toward and away from path P. The rod 36 also has a straight central section 41 with forwardly curved ends 42. The rod 35 is likewise adjustably mounted on supports 44 depending from supports 20 for movement toward and away from path P. The straight sections 38 and 41 of rods 35 and 36 are positioned parallel to the normal and eviscerating portions $P_N$ and $P_E$ of path P. The leading right hand curved end 42 of rod 36 extends across the right hand normal subpath $P_N$ of path P as seen in FIG. 2 to deflect the shackles 30 rearwardly from subpath $P_N$ through transistion subpath $P_T$ to the evisceration subpath $P_E$ of path P. As seen in FIG. 3, it will be seen that the eviscerating subpath $P_E$ is displaced rearwardly and upwardly of the normal subpath $P_N$ a vertical distance $y$ and a horizontal distance $x$ as will become more apparent. The straight central sections 38 and 41 of rods 35 and 36 hold the shackles 30 as they are moved along the eviscerating subpath $P_E$.

A base frame 50 mounts the holding assembly 15 and deflector assembly 16 with respect to the path P. The base frame 50 includes four spaced apart upstanding posts 51, each having a height adjustment mechanism 52 at the bottom thereof as best seen in FIG. 3. Intermediate braces 54 connect the posts 51 and a top carriage frame 55 connects the tops of the posts.

A carriage subassembly 60 seen in FIG. 4 is adjustably positioned on front legs 51 and mounts the holding assembly 15 thereon. The subassembly 60 includes a pair of cross collar units 61, one being mounted on each of the front posts 51. Each cross collar unit 61 includes a vertical collar 62 which is slidably received on post 51 and a horizontal collar 64 attached to collar 62. A height adjustment mechanism 65 connects unit 61 with post 51 to vary the height of unit 61 above the floor level FL. A carriage frame 66 is carried in units 61 and projects forwardly thereof to support the holding assembly 15. Frame 66 includes a central support tube 68 connected to a pair of rearwardly extending side support tubes 69. The side tubes 69 are slidably received through the horizontal collars 64 of units 61 to project the central tube 68 forwardly of base frame 50 and a locking mechanism is provided on collar 64 to selectively fix the position of carriage frame 66 as will become more apparent.

The holding assembly 15 is mounted on tube 68 so that it is positioned generally parallel to the eviscerating subpath $P_E$. The holding assembly 15 serves to orient the birds B as they pass along path P on shackle members 30 and in conjunction with the conveyor 12 and guide assembly 14 serve to position the birds B for the eviscerating means 11. As the birds B pass into the invention, an access opening into the body cavity has already been made at the vent of birds B as is best seen in FIG. 13 and as is conventionally done in poultry processing. The viscera is then to be removed through the access opening.

Assembly 15 includes an angle support 71 adjustably mounted on central tube 68 of carriage frame 66 as best seen in FIG. 5. Adjustment collars 72 on support 71 are rotatably received around tube 68 so that the angle of assembly 15 with respect to the horizontal and the longitudinal position of assembly 15 along tube 68 can be adjusted as will become more apparent. A locking mechanism 74 is provided on collars 72 to selectively fix the rotational and longitudinal position of assembly 15.

Figure 11:
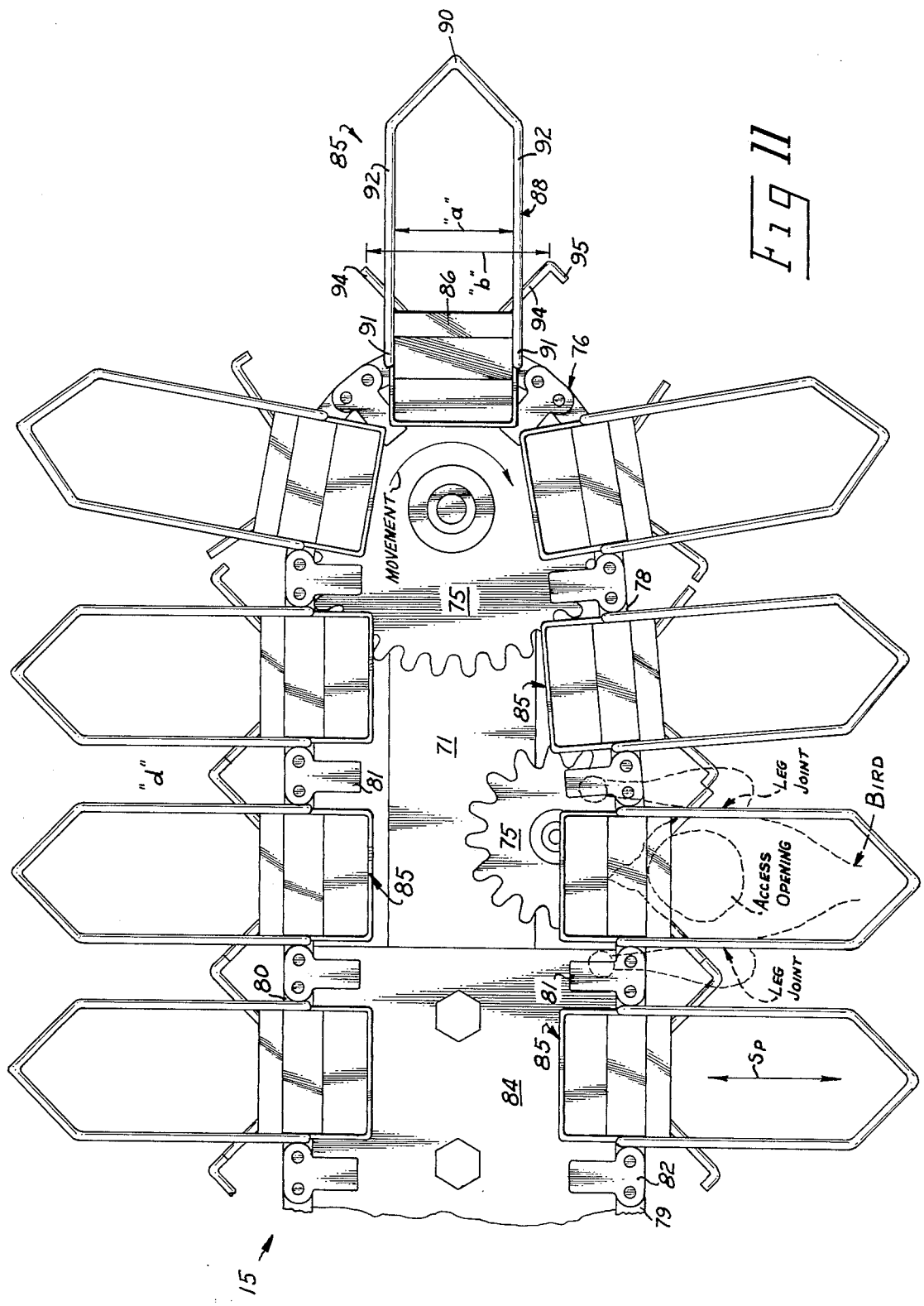
FIG. 11 is an enlarged partial top view taken along line 11—11 in FIG. 1.

The angle support 71 rotatably mounts a plurality of chain sprockets 75 thereon which lie in a common plane generally parallel to tube 68. An endless link chain 76 is carried by and in mesh with sprockets 75. Chain 76 has an entry flight 78 at the right hand end thereof as seen in FIG. 11, a forward flight 79 generally parallel to the tube 68 and eviscerating subpath $P_E$, and a rear return flight 80. Guide tabs 81 are provided on the links 82 of chain 76 to maintain the orientation of the chain 76. A guide 84 supports the forward flight 79 of chain 76 and is engaged by tabs 81 to orient the chain as will become more apparent.

Spaced along chain 76 is a plurality of holding members 85 seen in FIGS. 5 and 11 which engage the birds B at the joint between their legs and body to position the opening in conjunction with the shackles 30. Each holding member 85 includes a generally rectangular central body 86 mounted on links 82. This positions body 86 at an angle $\alpha$ with respect to the horizontal, here shown approximately 50°, and generally perpendicular to the longitudinal centerline of chain 76 as will become more apparent in FIG. 5.

Extending upwardly from body 86 is a U-shaped yoke 88 having its legs 89 attached to opposite sides of the upper end of body 86 and its bight 90 extending upwardly and forwardly of body 86. The lower ends of legs 89 extend first upwardly along the edges of body 86 and then curve upwardly and forwardly through bends 91 to form straight holding sections 92 that define an angle $\beta$ with respect to body 86 shown as approximately 115°. The bight 90 connects the upper ends of sections 92 and is bent with respect to sections 92 so that it is approximately horizontal. The legs 89 are generally parallel to each other and spaced apart a distance "a" such that the legs 89 will span the rear end of the body of the birds but will pass between the legs so that the legs 89 will engage the birds at the joints between the legs and body to hold the body against upward movement while the shackle 30 holds the body against downward movement.

A pair of diverging back support legs 94 are attached to opposite sides of the lower end of body 86 and extend forwardly of body 86 in a plane substantially normal to the plane of body 89. The distance "b" between the outer ends of legs 94 is sufficient to span the back of bird B as will become more apparent. The outer end of the trailing leg 94 is provided with a rearwardly extending projection 95.

The holding members 85 are attached to chain 76 the same prescribed distance $d$ apart as the trolley assemblies 26 so that a member 85 will be vertically aligned with each shackle 30 as it moves the birds along the eviscerating subpath $P_E$. An idler drive 96 connects one of the sprockets 75 to the drive means 29 of conveyor 12. The drive 96 includes an idler sprocket 98 engagable with and driven by the trolley assemblies 26 and drive means 29 in known manner. The output shaft 99 of sprocket 98 is universally connected to the input shaft 100 of sprocket 75 through an extendable shaft 101. The back support legs 94 are arranged so that the trailing projection 95 of each member 85 aligns with the leading end of the leg 94 of the next adjacent trailing holding member 85. The legs 94 then, form a continuous saw tooth shaped support along the length of the forward flight of chain 76.

Extending rearwardly from the top of body 86 behind the yoke 88 is a catch tray 102 which is generally horizontal. The tray 102 serves to at least partially catch and support the viscera when removed as will become more apparent.

The deflector assembly 16 is carried by the eviscerating means 11 so that it is moved with the means 11. The construction and operation of the assembly 16 will be described in more detail hereinafter.

OPERATION OF POSITIONING MEANS

In operation, the birds B are suspended from the shackles 30 by their hocks in a head lowermost position so that the overhead conveyor 12 moves the birds along the prescribed path P. The idler drive 94 connects the holding assembly 15 with the drive means 29 of the overhead conveyor 12 so that the holding members 85 are synchronously driven with the shackles 30 in order that a holding member 85 is always aligned with the bird B as it moves through the machine. The conveyor 12 moves the birds B along the prescribed path P from the right to the left as seen in FIG. 1. As the shackles 30 approach the right hand end of the holding assembly 15, the outside guide rod 36 engages the shackle 30 and deflects the shackle 30 rearwardly and upwardly from the normal subpath $P_N$ along the transistion subpath $P_T$. At the same time, the holding member 85 which is to be associated with the particular shackle 30 is moving along the entry flight 78 of the chain 76 toward the bird B. The appropriate adjustments of the holding assembly 15 have been made so that the yoke 88 on the holding member 85 passes into alignment with the bird B over the rump of the bird so that the legs 89 of the yoke 88 are vertically aligned with opposite sides of the body of the bird and passes between the legs of the bird.

As the outside guide rod 36 continues to deflect the shackle 30 rearwardly, the bird B is raised with respect to the holding member 85 so that the legs 89 of yoke 88 extend over the body of the bird and engage the bird at the joints between its legs and body. In this position seen in FIG. 13, it will be seen that the body of the bird is positioned so that the preformed access opening at the rear end of the bird is located within a relatively fixed plane FP generally parallel to the legs 89 of the yoke 88 and eviscerating subpath $P_E$ while the breast portion of the bird is supported through the bone and muscle structure of the bird in cantilever fashion forwardly of the holding member 85. It will be noted that the joints between the body and legs of the bird will be normally held at the lower ends of the straight sections 92 of legs 89 adjacent the bends 91. Thus the access opening passes longitudinally along plane FP with the synchronous movement of the shackle members 30 and holding members 85. Because of the resilience of the carcass, the bird can be moved along the straight sections 92 of legs 89 while the access opening remains in the plane FP. This means that the access opening can be moved within the plane FP along a positioning subpath $S_P$ extending generally transversely across the plane. When the bird is released, it will be seen that it returns to its initial position adjacent the bends 91. The angle $\tau$ between the bight 90 and sections 92 is such that the bight 90 serves to limit the outward movement of the bird along the sections 92. When the bird is held between the shackle member 30 and holding member 85, it will be seen that the breast portion of the bird is resiliently supported so that it can be moved toward and away from the body 86 of the holding member 85. This allows the breast portion to be moved as required for the eviscerating operation as will become more apparent. The bird B is held in this position by the guide rods 35 and 36 and the holding member 85 as the bird passes along the eviscerating subpath $P_E$. Thereafter, the outside guide rod 36 allows the shackle 30 to move forwardly back toward the normal subpath $P_N$ so that the bird B is lowered with respect to the legs 89 of the yoke 88 to allow the yoke 88 to clear the body of the bird and pass over its rump as the bird exits the holding assembly 15.

EVISCERATING MEANS

Referring now to FIGS. 1–4, it will be seen that the eviscerating means 11 is located adjacent the positioning means 10 so that the eviscerating operation can be performed during passage of bird B along the eviscerating subpath $P_E$. The eviscerating means 11 includes a plurality of eviscerating tools 110 reciprocally mounted by a support table assembly 111 movably mounted by base 50. The tools 110 reciprocate along an eviscerating path EP generally normal to the subpath $P_E$ while the support table assembly is moved along a positioning path PP generally parallel to the subpath $P_E$.

Each tool 110 is an open rod loop best seen in FIGS. 6 and 7 which is pivoted on the projecting end of a mounting shaft 112 reciprocally mounted on table assembly 111. The tool 110 includes a base 114 which has a pair of pivot ears 115 pinned to the projecting end of the mounting shaft 112 about axis $A_1$ and a pair of upstanding positioning ears 116. A U-shaped base rod 118 has the ends of its legs 119 attached to base 114 so that its bight 120 projects forwardly of base 114. The legs 119 are generally parallel and spaced apart a distance "c" less than the distance $a$ between the legs 89 of yoke 88 on holding member 85 so that the rod 118 can pass between the legs 89 as will become apparent. It will be noted that the legs 119 bend upwardly and outwardly, then outwardly generally parallel to path EP, then downwardly and outwardly and finally outwardly generally parallel to path EP again at the bight 110. Brace rods 121 extend between the ears 115 and the legs 119 intermediate their ends. This forms a space 112 between legs 119 of rod 118 and the rods 121 and a drawing pocket 124 below rods 121 behind the forward ends of legs 119 and bight 120 as will become more apparent.

The support table assembly 111 includes a movable support table 130 which is a generally rectangular base plate 131 having two pairs of aligned bushings 132 on the lower side thereof as seen in FIG. 4. The bushings 132 are slidably mounted on support rods 134 carried by the carriage frame 55. The rods 134 are oriented generally parallel to the eviscerating subpath $P_E$ as seen in FIG. 2 so that the support table 130 is mounted for reciprocal movement along the positioning path PP as will become more apparent. The leading edge 135 of base plate 131 is generally parallel to subpath $P_E$ of path P and spaced rearwardly thereof as seen in FIG. 2. The table 130 defines an angle $\gamma$ with the horizontal, here shown as approximately 25° in FIG. 4.

A pair of cross slides 140 are mounted on upstanding flanges 136 at opposite ends of table 130 adjacent the leading edge 135 thereof. Each slide 140 as best seen in FIG. 10 includes an outside channel 141 which is adjustably positioned along an axis substantially normal to the surface of the base plate 131 by hand wheel 142. An inside bearing block 144 is slidably carried by channel 141 and is adjustably positioned along an axis generally parallel to the surface of plate 131 by an adjusting screw 145. The adjusting screws 145 are drivingly connected by drive chain 146. The bearing blocks 144 pivotally mount an undercarriage frame 150 therebetween along the front edge thereof. The pivotal position of the undercarriage frame 150 is controlled through the threaded rod 148 connected between the rear edge of table 130 and the frame 150 as seen in FIG. 4.

The undercarriage frame 150 includes a pair of side rails 151 joined at their front ends by a front bushing rail 152 and at their back ends by a back rail 154. An intermediate bushing rail 155 connects side rails 151 rearwardly of bushing rail 152. Rails 152 and 155 have a series of aligned sets of bushings 156 therein which slidably carry the mounting shafts 112 for reciprocal movement along the eviscerating paths EP. The shafts 112 are, of course, parallel to each other. The front ends of side rails 151 are provided with stub shafts 158 rotatably journalled in bearing blocks 144 so that the frame 150 can be pivoted about an axis $A_2$ generally parallel to the eviscerating subpath $P_E$. A drive angle 160 is fixedly connected to the rear ends of mounting shafts 112 so that all of the shafts 112 are simultaneously moved as a unit. The drive angle 160 is fixed to the end of piston rod 161 of drive cylinder 162, the cylinder 162 being pinned to the back rail 154 of undercarriage frame 150, thus, it will be seen that the mounting shafts 112 and tools 110 will be extended toward the fixed plane FP when piston rod 161 is extended and withdrawn away from plane FP as piston rod 161 is retracted.

A tool rotating drive assembly 170 is provided for selectively pivoting the tools 110 about the pivot axis $A_1$. The drive assembly 170 includes a subframe 171 connected at its rear end to the drive angle 160 so that it is moved with angle 160 and mounting shafts 112 as seen in FIGS. 4 and 9.

Subframe 171 includes a back beam 172 attached to angle 160 and a pair of side angles 174 attached to opposite ends of beam 172. The side angles 174 extend forwardly from beam 172 in vertical alignment with the two outermost mounting shafts 112. The front ends of side angles 174 are attached to the outermost mounting shafts 112 by spacers 175 forwardly of the front bushing rail 152 and immediately behind the connection of tool 110 to shafts 112. This allows the frame 171 to clear the undercarriage frame 130 so that frame 171 can move with shafts 112 and tools 110 without interference with undercarriage frame 150.

A tool rotating cylinder 176 is pinned to the center of the back beam 172 and extends forwardly therefrom toward tools 110. The piston rod 178 of cylinder 176 is attached to a drive angle 180 which extends between the side angles 174 generally parallel to the back beam 172. Thus, as the piston rod 178 is extended, the drive angle 180 moves forwardly toward tools 110 between side angles 174.

A drive rod 181 connects each pair of the positioning ears 116 to the drive angle 180 so that as the drive angle 180 is moved forwardly, the tools 110 will be pivoted downwardly about axis $A_1$. Each of the drive rods 181 is pinned between the ears 116 on tool 110 at 182 at its front end and resiliently connected to the drive angle 180 at its threaded rear end 184 by a spring assembly 185 best seen in FIG. 9.

Spring assembly 185 includes a pair of compression coil springs 186 positioned on opposite sides of angle 180 and about the threaded end 184 of rod 181. It will be noted that the end 184 freely passes through an appropriate aperture in angle 180. The outboard end of each spring 186 is adjustably connected to the threaded end 184 of rod 180 by a nut and washer assembly 188 that threadedly engages the end 184. Therefore, it will be seen that the tool 110 can give through the spring assembly 185 as will become more apparent.

The outboard drive rods 181 are slidably and rotatably supported in a pair of rod end bearings 190 carried by side angles 174. This locates the rear ends of drive rods 181 and the drive angle 180.

The forward movement of the drive angle 180 and thus the drive rods 181 is controlled by a pair of front stop assemblies 200 seen in FIGS. 4 and 9. The front stop assemblies 200 are mounted on subframe 171 and movable therewith. Each assembly 200 includes a lower plate 201 extending forwardly from the back beam 172 of subframe 171 under the drive angle 180 connected to drive rods 181 and an upper plate 202 extending forwardly from the back beam 172 over the drive angle 180 and drive rods 181. The front ends of plates 201 and 202 are connected by an internally threaded block 204 located forwardly of drive angle 180. A stop bolt 205 is screwed through block 204 so that its rear end facing the drive angle 180 forms an abutting surface 206 that engages the drive angle 180 to limit its forward movement.

A rear stop assembly 210 is mounted between the front stop assemblies 200 to selectively limit the rearward movement of the drive angle 180 and drive rods 181. The rear stop assembly 210 includes an inverted U-shaped frame 211 with depending legs 212 connected at their upper ends by web 214. A shaft 215 connecting legs 212 is journalled in bearing blocks 216 mounted on the upper plates 202 of front stop assemblies 200 so that frame 211 pivots about axis $A_3$ generally parallel to axis $A_1$ about which tools 110 pivot. The lower ends 218 of legs 212 lie behind the drive angle 180 and each leg 212 threadedly mounts a stop bolt 219 which projects forwardly from the end 218 toward drive angle 180 to form a rear abutting surface 220 behind angle 180 to limit its rearward movement.

A positioning cylinder 221 is pinned to ears 222 on the rear beam 172 of subframe 171 and has its piston rod 224 pinned to the web 214 of frame 211 so that the lower ends 218 of legs 212 are pivoted rearwardly as the piston rod 224 is extended and vice versa. Thus, it will be seen that the abutting surfaces 220 of bolts 219 are in an intermediate stop position when the piston rod 224 is retracted and in a final position rearwardly of the intermediate position when the piston rod 224 is extended as will become more apparent.

As best seen in FIG. 4, the support table 130 is reciprocated back and forth along the support rods 134 and positioning path PP by a drum cam 230 similar in construction to that disclosed in our copending application Ser. No. 217,206. The cam 230 has an annular side wall 231 closed by end walls 232. The cam 230 is mounted on a central shaft 234 rotatably mounted on base frame 50 below table 130 so that the base plate 131 of support table 130 lies over the side wall 231 generally parallel thereto along its length and also tangent thereto. An endless, generally helically extending camming slot 235 is provided through the side wall 231 and a cam follower 236 journalled on the bottom of table 130 extends through and is engaged at the slot 235 by cam 230. The slot 235 is arranged so that the table 130 is moved to the left from its initial position $P_I$ seen on the right in FIG. 1 to its final position $P_F$ seen on the left in FIG. 1 and then back to its initial position $P_I$ upon each complete revolution of cam 230.

The cam 230 is also driven from the idler drive 96 through a chain and sprocket arrangement 238 as seen in FIG. 1 drivingly connected to one end of the central shaft 234. This insures synchronization of the movement of table 130 with the movement of the birds carried by the shackles 30 and holding members 85 as will become more apparent.

Referring to FIGS. 3, 7, 8 and 12, it will be seen that the deflector assembly 16 is mounted on and depends below the base plate 131 at its leading edge 135 so that the deflector assembly 16 is moved back and forth along the path PP with table 130. The assembly 16 includes generally a support frame 240 which extends downwardly from table 130 behind the holding assembly 15, then forwardly under the assembly 15 above the wash trough WT and then upwardly in front of the assembly 15. Frame 240 includes a pair of spaced apart U-shaped members 241 connected by cross plates 242. The rear longer legs 244 of member 241 mount a pair of rollers 245 at their lower ends which roll along the lower brace 56 connecting the front posts 51 of base frame 50. The front shorter legs 246 of members 241 are slotted at 248 to adjustably mount a support base 249 between legs 246 generally parallel to the floor level FL.

A pair of bearings 250 mounted at opposite ends of the base 249 facing the holding assembly 15 rotatably journal a support shaft 251 therebetween for rotation about an axis $A_4$ generally parallel to the eviscerating subpath $P_E$.

A plurality of deflector members 255 are rotatably mounted on and spaced along the length of shaft 251. The spacing $d$ between the members 255 is the same as that between the shackles 30, holding members 85, and tools 110 as will become apparent. Each deflector member 255 includes a support tube 256 rotatably journalled on shaft 251 as seen in FIGS. 7 and 8 and from which an upstanding support rod 258 extends. A thin resilient deflector plate 260 extends from tube 256 outwardly to the end of rod 258. The plate 260 extends first inwardly toward the holding assembly 15, then upwardly, and finally forwardly to the upper end of rod 258. Thus, the central section 261 of plate 260 can curve to fit the breast portion of the bird as will become more apparent.

Adjacent deflector members 255 are interconnected by torsion springs 265 as seen in FIG. 8. The outboard torsion springs $265_o$ are connected to drive collars 266 fixed to shaft 251. Thus, it will be seen that the springs 265 urge the deflector members 255 toward the same rotational position as determined by the rotational position of shaft 251 yet allow relative deflection between members 255 to allow the deflection members to individually conform to the shape of the breast portion of the bird as will become more apparent.

Figure 12:
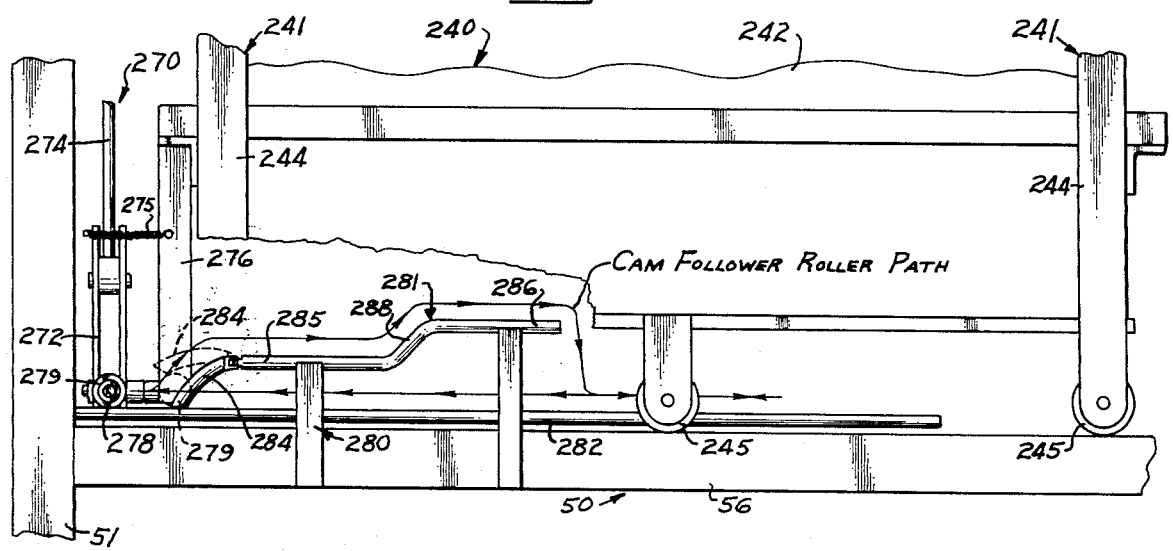
FIG. 12 is a view showing the deflector cam taken along line 12—12 in FIG. 3.
Figure 14:
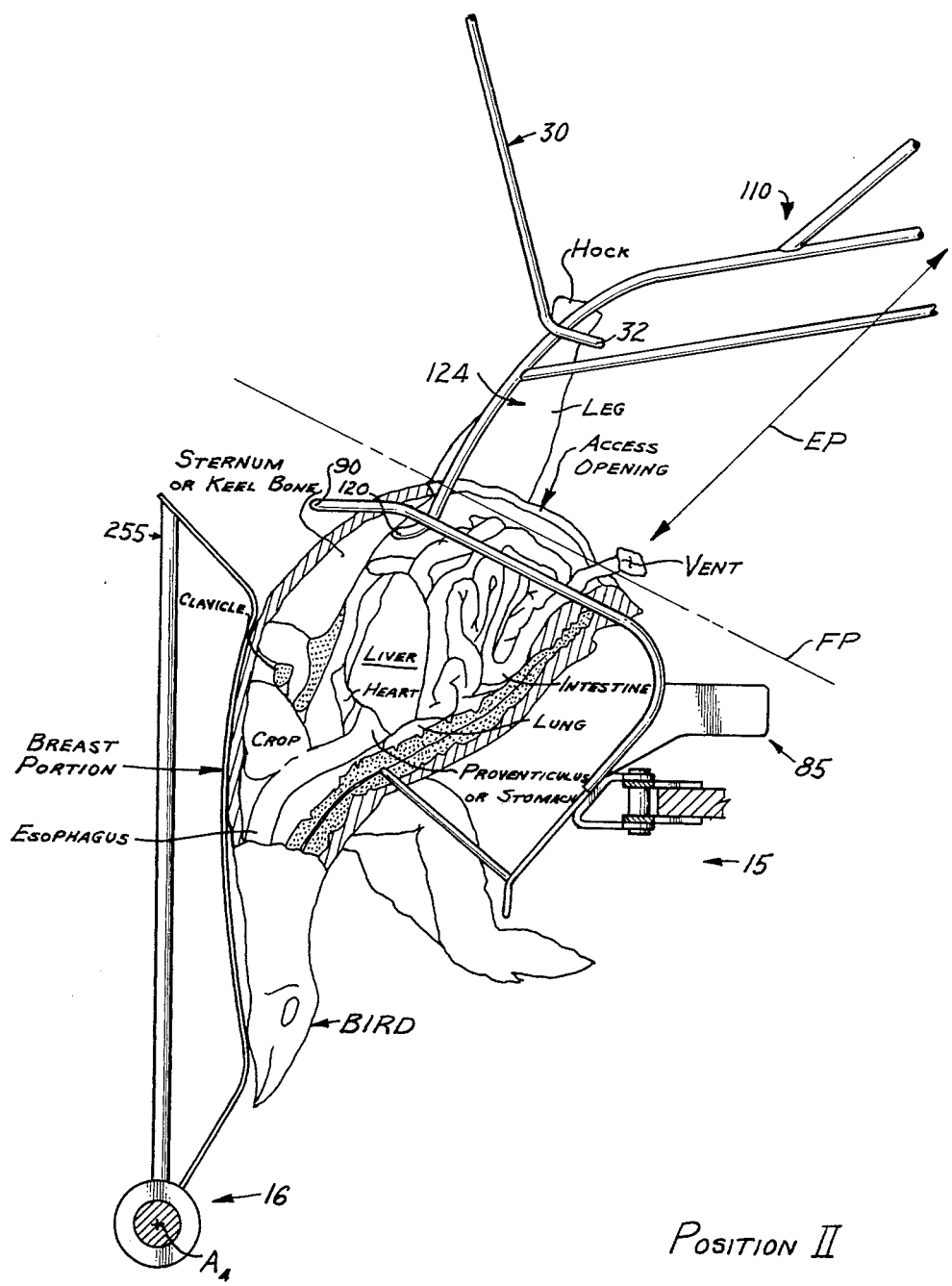
FIG. 14 is a view similar to FIG. 13 at the start of the processing operation.

A deflection drive assembly 270 seen in FIGS. 3 and 12 is provided for selectively pivoting shaft 251 to cause the deflection members 255 to engage the breast portions of the birds as seen in FIG. 14. Assembly 270 includes a drive arm 271 mounted on one end of shaft 251 which is pinned to a transfer arm 272 through a drive link 274. The transfer arm 272 is constantly urged in a clockwise direction as seen in FIG. 3 by spring 275. Arm 272 is rotatably mounted on a bracket 276 carried by frame 240. A drive shaft 278 is attached to arm 272 to pivot arm 272 as the shaft 278 is raised and lowered. A cam follower roller 279 is journalled on the rear end of drive shaft 278 for engaging a cam 280 mounted on the lower brace 56 of base frame 50.

Cam 280 has an upper rod 281 and a lower rod 282 along which roller 279 is moved as seen in FIG. 12. Rod 281 has an intermediate rise section 285 and a final rise section 286 with a transistion section 288 connecting the trailing end of intermediate section 285 with the leading end of final section 286 so that the cam follower roller 279 can pass from section 285 to section 286. The rise sections 285 and 286 of rod 281 are generally parallel to rod 282 and the leading or left end as seen in FIG. 12 of the intermediate rise section 285 has a curved transfer rod 284 pivoted thereto. The lower end of rod 284 normally rests on top of rod 282 but can be pivoted upwardly to let the roller 279 pass thereby as the support table 130 is returned to its initial position. Initially, the roller 279 rests on the lower rod 282 to the left of transfer rod 284 as seen in FIG. 12. This causes the deflector members 255 to be pivoted forwardly as shown by solid lines in FIGS. 7 and 13. As the table 130 is moved to the right as seen in FIG. 12 toward its final position, the roller 279 rolls up the transfer rod 284 and onto the intermediate section 285 to pivot the deflector members 255 rearwardly to an intermediate position against the breast portions of the birds as shown by dashed lines in FIG. 7 and by solid lines in FIG. 14. This causes the deflector plate 260 to bear down on the breast portion of the bird to maintain contact between the bight 120 of tool 110 and the sternum or keel bone as the tool 110 is inserted into the body cavity as will become more apparent.

When the tool 110 has been fully inserted into the body cavity and the bight 120 pivoted downwardly toward the holding member 85, the cam follower roller 279 moves up the transistion section 288 onto the final rise section 286 so that the deflector members 255 again move into contact with the breast portion of the bird as seen in FIG. 16. The members 255 are held in this position as the tool 110 is being withdrawn to prevent the breast portion of the bird from lifting as the tool passes over the backbone as will become more apparent. When the tool 110 has been withdrawn, the table 130 has moved sufficiently to the right as seen in FIG. 12 so that the roller 279 drops off of the right end of the rise section 286 onto cam rod 282 to allow the deflector members 255 to pivot forwardly again away from the birds under the influence of spring 275. When the table 130 is returning from its final position back to its initial position, the roller 279 moves along rod 282 and under the upper rod 281 pushing the transfer rod 284 upwardly as seen by dashed lines in FIG. 12. After the passage of roller 279 by transfer rod 284, it falls back into place on rod 282 so that the roller 279 passes thereover on the next cycle.

OPERATION OF EVISCERATING MEANS

As seen in FIG. 1, the conveyor 12 moves the birds along the path P from the left to the right. The access opening at the vent in the birds has been cut upstream of the apparatus of the invention in the processing line. The birds are then moved along the transistion subpath $P_T$ and then along the eviscerating subpath $P_E$ as has been described. For sake of simplicity, the operation of the right hand or trailing tool 110 and deflector member 255 will be described, it being understood that the other tools and deflector members operate accordingly.

When a bird reaches Position I labelled in FIG. 1 and shown in detail in FIG. 13, the table 130 is in its initial position $P_I$ indicated in FIG. 1. In this position, the tools 110 are in their retracted positions and deflection members 255 are pivoted forwardly. This places the bight 120 of tool 110 behind the plane FP but in alignment with the access opening in the rear end of the bird. It will be noted that the tool 110 is aligned with holding member 85 and shackle 30 so that the base rod 118 will pass between the legs 89 of yoke 88 on holding member 85.

The tool 110 is then extended along the eviscerating path EP by cylinder 162 until the bight 120 passes through plane FP between legs 89 of yoke 88 on holding member 85 and just enters the access opening of the bird. At this time, the frame 211 of the rear stop assembly 210 is pivoted so that the abutting surfaces 220 on bolts 219 are moved rearwardly from their intermediate positions to their final positions. This allows the piston rod 178 of tool rotating cylinder 176 to retract further to raise the bight 120 by pivoting tool 110 upwardly around axis $A_1$. This slides the body of the bird outwardly along the legs 89 on yoke 88 of holding member 85 to position II labelled in FIG. 1 and shown in detail in FIG. 14 since the bight 120 of tool 110 engages the rear end of the sternum or keel bone as it is pivoted upwardly. The bight 90 of yoke 88 limits the outward movement of the bird along legs 89. At the same time, the cam follower roller 279 has moved up the transfer rod 284 of cam 280 onto the intermediate rise section 285 of rod 281 to pivot the deflector member 255 to its intermediate position into contact with the breast portion of the bird also seen in FIG. 14. This causes the central section 261 of deflector plate 260 to bear downwardly on the breast portion of the bird in order to maintain contact between the bight or tip 120 of tool 110 and the sternum or keel bone as the tool is inserted.

Figure 15:
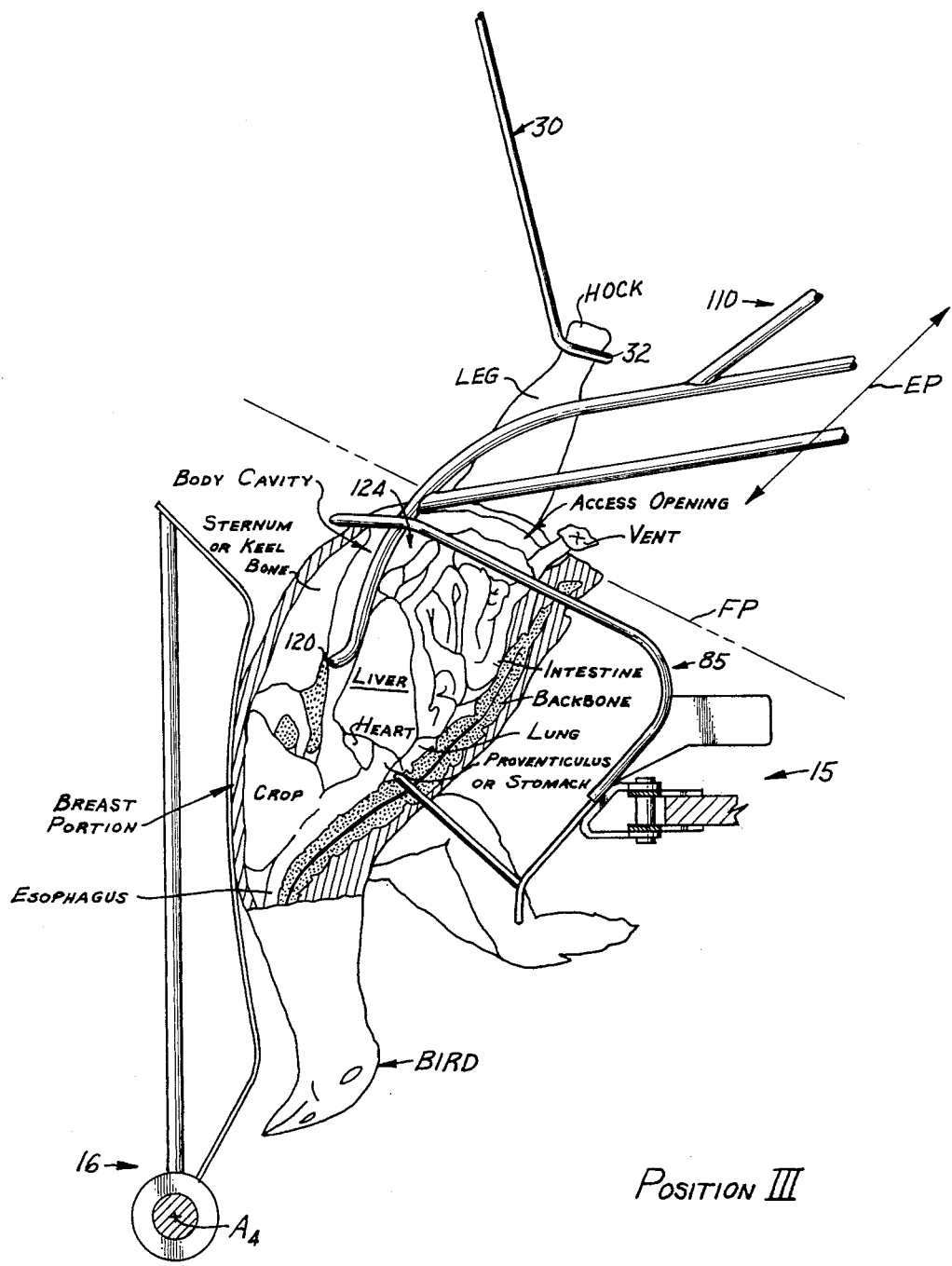
FIG. 15 is a view similar to FIG. 14 as the tool is being inserted.

As the tool 110 continues to move along the path EP toward the bird, the tool moves down into the body cavity with the bight 120 riding along the inside edge of the sternum. This causes the viscera to slip into the drawing pocket 124 so that the tool 110 is between the viscera and the edge of the body cavity at Position III labelled in FIG. 1 and shown in detail in FIG. 15 where the tool 110 has reached the forward limit of its movement along the eviscerating path EP.

When tool 110 reaches the forward limit of its movement along path EP, the tool rotating cylinder 176 extends piston rod 178 to pivot tool 110 downwardly around axis $A_1$ to Position IV labelled in FIG. 1 and shown in detail in FIG. 16. The bight 120 of tool 110 now presses down against that side of the front end of the body cavity at the backbone to force the back of the bird down against the body 86 of holding member 85. The body of the bird has now moved back down the legs 89 of yoke 88 and the viscera is gathered in drawing pocket 124. At the same time, the movement of table 130 along the positioning path PP causes the cam follower roller 279 to move up the transistion section 288 of rod 281 onto the final rise section 286. This pivots deflector member 255 further in toward the bird so that the central section 261 of the deflector plate 260 again bears down on the breast portion of the bird to prevent the forward portion of the bird from lifting from the body 86 of holding member 85 as the tool 110 is withdrawn.

Figure 17:
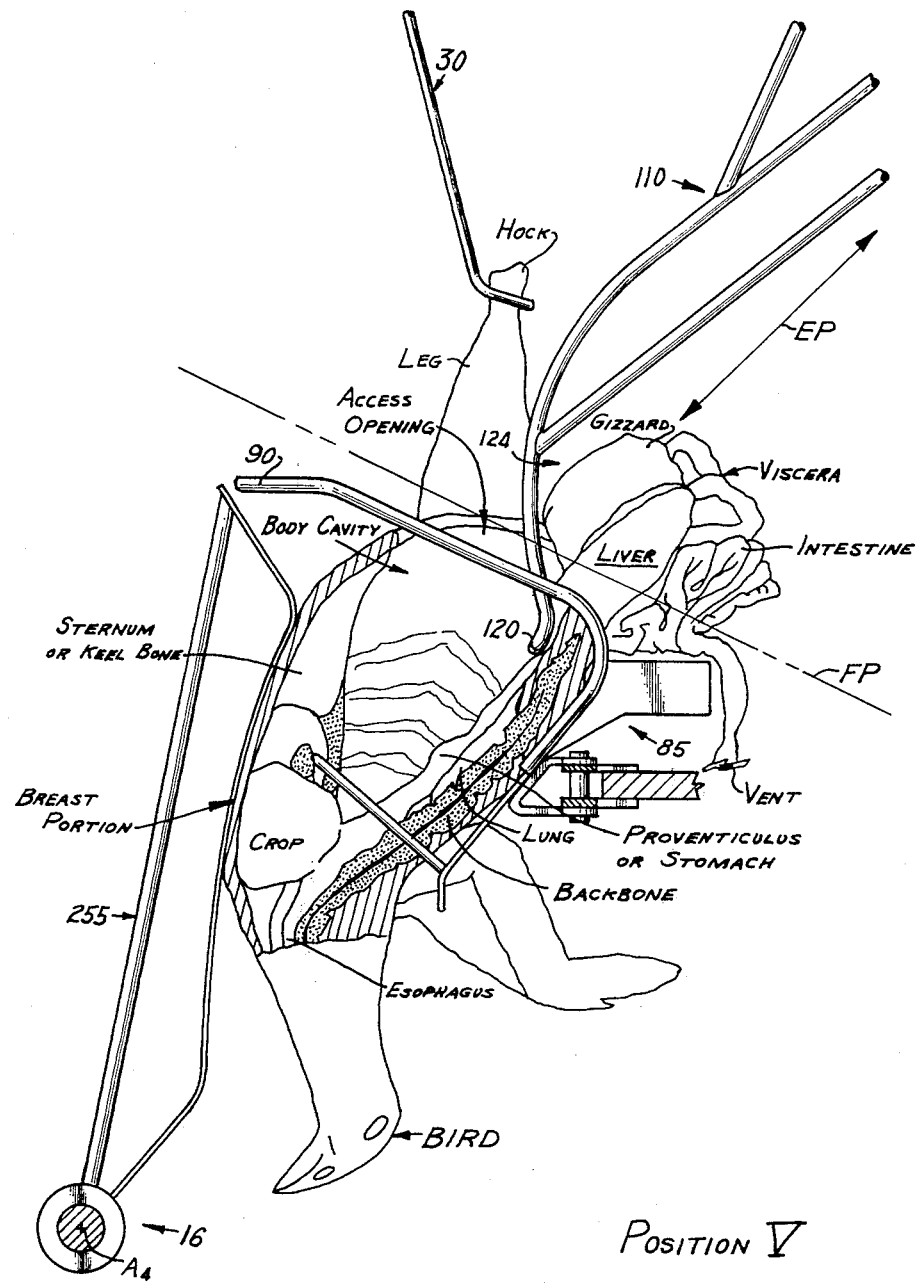
FIG. 17 is a view similar to FIG. 16 showing the tool being withdrawn.

The tool 110 is then withdrawn from the body cavity by retracting piston rod 161 of cylinder 162 drawing the viscera therewith within pocket 124 so that the viscera is withdrawn through the access opening at Position V labelled in FIG. 1 and seen in detail in FIG. 17. The spring assembly 185 allows sufficient pivotal movement of the tool 110 as it is withdrawn while maintaining the pressure of bight 120 against the backbone to permit the bight 120 to ride over the backbone area without damage thereto. As the bight 120 of tool 110 slides rearwardly in the bird, it slides along the esophagus until it reaches the proventriculus or stomach. The pressure of the bight 120 is sufficient to cause the stomach to be initially shifted rearwardly to pull on the crop through the esophagus to loosen it. Because the crop is restricted by the breast of the bird, the reaction force on the esophagus by the crop eventually causes the bight 120 to slip over the stomach and withdraw the viscera out of the access opening. The crop, of course, is removed in a later conventional operation. It will be noted that all of the viscera will be withdrawn except, in most instances, the lungs. The lungs are recessed in the back as seen in FIG. 17 so that they are difficult to withdraw with the rest of the viscera. The lungs are usually removed separately with a machine such as that disclosed in our copending application Ser. No. 217,206.

The tool 110 is further withdrawn and pivoted back to the initial position seen in FIG. 13 so that the viscera falls onto the tray 102 on holding members 85. At the same time, the cam follower roller 279 drops off of the trailing end of the final rise section 286 of rod 281 back onto rod 282 so that the deflector members 255 are pivoted away from the bird back to the position seen in FIG. 13. The tray 102 supports the viscera until it clears the machine to prevent it from catching in the chain 76 and sprockets 75 on holding assembly 15.

Figure 18:
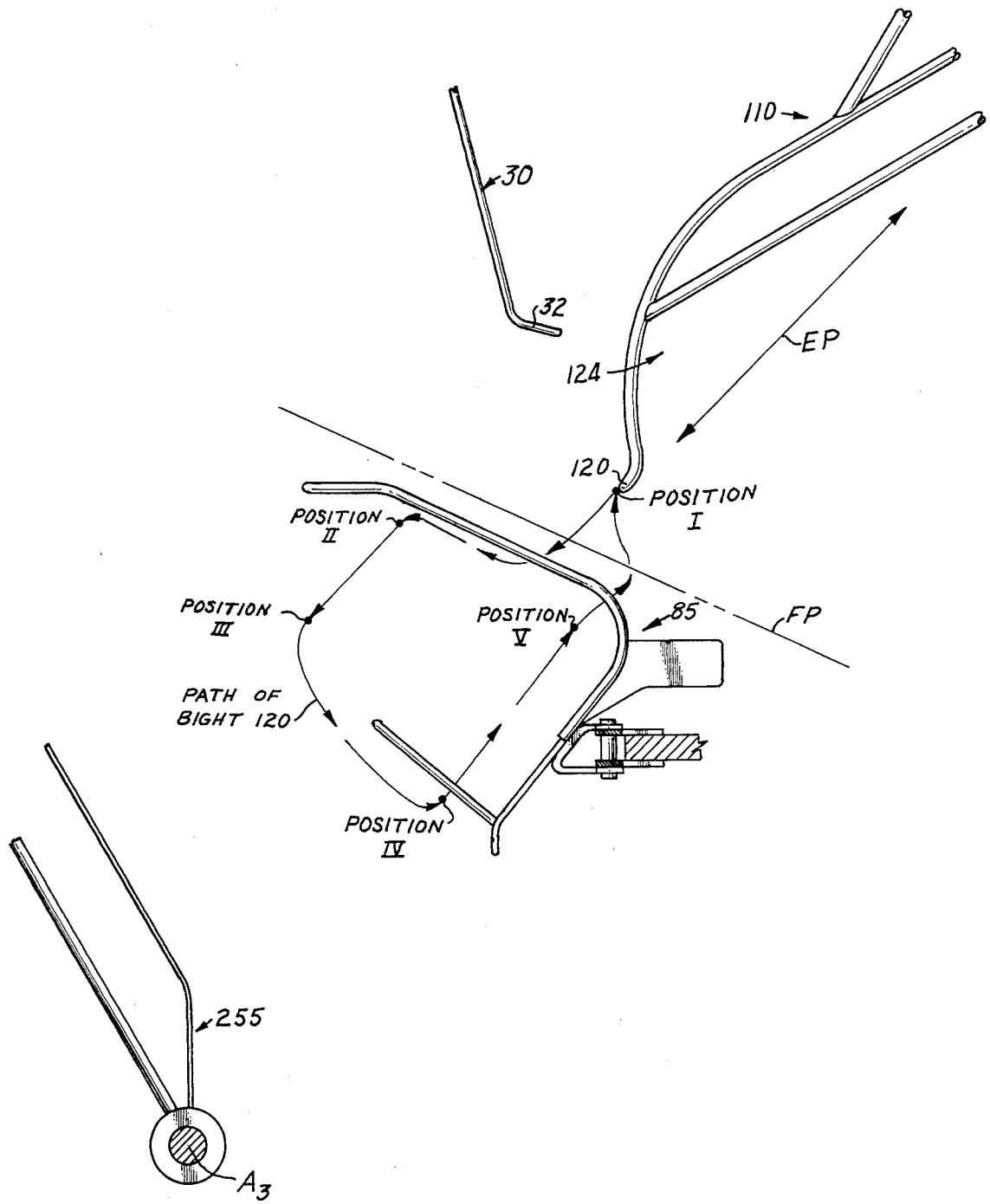
FIG. 18 is a diagram showing the path of the tip of the tool.

The birds then are moved out of the machine by conveyor 12 to the left as seen in FIG. 1 with the viscera still connected to the bird through its esophagus and hanging over its back as required by the inspection authorities. The support table 130 is then moved back to its initial position and the process repeated. The path of the bight 120 of tool 110 and the positions of deflector member 255 are seen in FIG. 18.

While specific embodiments of the invention have been disclosed herein, it is to be understood that full use may be made of substitutions, modifications and equivalents without departing from the scope of the invention as disclosed herein.

We claim:

1. Poultry eviscerating apparatus for positioning poultry having an access opening to the body cavity thereof at its vent including:
   conveying means for successively moving said poultry along a prescribed path in a head lowermost position, said conveying means including a hock engaging member for supporting said poultry by their hocks; and,
   holding means operatively associated with said conveying means for selectively engaging said poultry carried by hock engaging member at the joints between the legs and body of the poultry in opposition to said hock engaging member to support said poultry between said hock engaging member and said positioning means so that the access opening is located in a relatively fixed plane for limited movement of the access opening within the plane generally transversely of said prescribed path while the breast portion of said poultry is allowed to move with respect to said plane.

2. The poultry eviscerating apparatus of claim 1 further including:
   eviscerating tool means for removing viscera from the body cavity of the poultry through the access opening; and,
   carriage means for selectively inserting said eviscerating tool means through the access opening into the body cavity to engage and remove the viscera through the access opening.

3. The poultry eviscerating apparatus of claim 1 further including:
   deflection member means; and,
   undercarriage means for resiliently moving said deflection member means into engagement with the breast portion of the poultry to force the breast portion of the poultry toward said holding means.

4. The apparatus of claim 1 further including interconnect means for synchronizing the movement of said holding means with said conveying means.

5. The apparatus of claim 4 wherein said holding means includes at least one pair of spaced apart, generally parallel support members for engaging the poultry at the leg joints between the legs and body of the poultry on opposite sides of the body of the poultry in opposition to said hock engaging member so that the breast portion of the poultry can pivot about the leg joints and the leg joints can be moved along said parallel support members of said holding means.

6. The apparatus of claim 5 wherein said holding means further includes limiting means for limiting the movement of the leg joints of the poultry along said support members of said holding means.

7. The apparatus of claim 6 wherein said limiting means includes a first member connecting one of the ends of said support members and a second member connecting the other of the ends of said support members.

8. The apparatus of claim 1 further including positioning means for selectively varying the spacing between said hock engaging member and said holding means.

9. The apparatus of claim 1 further including positioning means for selectively varying the spacing between said hock engaging member and said holding means, and wherein said holding means includes:
  a base frame;
  a carriage subassembly adjustably mounted on said base frame;
  a plurality of sprockets rotatably journalled in said carriage subassembly;
  an endless chain extending around said sprockets in mesh therewith, said chain having a flight generally parallel to and spaced below said prescribed path a predetermined distance;
  a plurality of holding members mounted on said chain in spaced apart positions, each of said holding members vertically aligned with a hock engaging member of said conveying means, each of said holding members comprising a body oriented at a first prescribed angle with respect to the horizontal, a U-shaped yoke including a pair of spaced apart, generally parallel legs and a bight joining said legs, the ends of said legs opposite said bight connected to said body so that said legs define a second prescribed angle with respect to said body, said bight defining a third prescribed angle with respect to said legs; and,
  interconnect means for synchronizing the movement of said holding members with said conveying means.

10. The apparatus of claim 2 wherein said carriage means includes:
  support table means;
  drive means for reciprocally moving said support table means along a positioning path generally parallel to said prescribed path synchronously with the movement of said hock engaging member; and,
  mounting means carried by said support table means for movement therewith along said positioning path, said eviscerating tool means mounted on said mounting means for movement toward and away from said prescribed path along an eviscerating path generally normal to said prescribed path and defining a fourth prescribed angle with the horizontal, said mounting means further mounting said eviscerating tool means for pivotal movement about a first prescribed pivot axis generally parallel to said prescribed path.

11. The apparatus of claim 10 wherein said mounting means includes tool rotating means for selectively pivoting said eviscerating tool means about said first prescribed pivot axis.

12. The apparatus of claim 11 wherein said mounting means further includes connector means resiliently connecting said tool rotating means with said eviscerating tool means for allowing limited relative pivotal movement of said eviscerating tool means about said first axis while causing said tool means to exert a substantially constant force on the poultry.

13. The apparatus of claim 12 wherein said tool rotating means includes rear stop means for selectively limiting the pivotal movement of said eviscerating tool means in a first direction in a first pivotal position and a second pivotal position.

14. The apparatus of claim 11 wherein said mounting means includes:
  undercarriage frame means pivotally mounted on said support table means about a second axis generally parallel to said first axis;
  tilt means interconnecting said support table means and said undercarriage frame means for selectively moving said undercarriage frame means with respect to said support table means about said second axis; and,
  mounting shaft means carried by said undercarriage frame means for movement with said undercarriage means along said positioning path and said second axis, and for movement with respect to said undercarriage frame means along an eviscerating path generally normal to said first and second axes and said prescribed path.

15. The apparatus of claim 14 wherein said tool rotating means includes:
  drive rod means operatively connected to said eviscerating tool means for pivoting said eviscerating tool means about said first prescribed axis;
  drive member means;
  connector means resiliently connecting said drive rod means to said drive member means; and,
  tool drive means operatively connected to said drive member means for selectively moving said drive member means to cause said eviscerating tool means to pivot about said first prescribed axis independently of the movement of said mounting shaft means, said connector means allowing relative pivotal movement of said eviscerating tool means about said first axis independently of said tool drive means while causing said eviscerating tool means to exert a substantially constant force on the poultry.

16. The apparatus of claim 15 wherein said tool rotating means further includes:
  first stop means for selectively limiting the pivotal movement of said eviscerating tool means about said first prescribed axis in a first direction, said first stop means having an intermediate position for limiting the pivotal movement of said eviscerating tool means at a first position, and said first stop means having a final position for limiting the pivotal movement of said eviscerating tool means at a second position;
  stop drive means operatively connected to said first stop means for selectively moving said first stop means between said intermediate position and said final position; and,
  second stop means for selectively limiting the pivotal movement of said eviscerating tool means about said first prescribed axis in a second direction opposite to said first direction.

17. Poultry eviscerating apparatus for processing poultry having a preformed access opening to the body cavity thereof at its vent including:
  eviscerating tool means for selectively removing viscera from the body cavity of the poultry through the access opening; and,
  deflection member means for selectively and resiliently engaging the breast portion of the poultry to force said tool into engagement with the keel bone as said tool is inserted into the body cavity of the poultry.

18. The apparatus of claim 17 further including deflector drive means for selectively moving said deflection member means into engagement with the breast portion of the poultry synchronously with the insertion of said eviscerating tool means into the body cavity of the poultry.

19. The apparatus of claim 18 wherein said deflection member means includes:
a deflection undercarriage means; and,
a deflection member mounted on said deflection undercarriage means, said deflector member having a breast engaging section resiliently connected to said deflection support to allow relative movement between said breast engaging section and said deflection undercarriage means while maintaining substantially constant pressure on the breast portion of the poultry.

20. The apparatus of claim 19 wherein said deflection undercarriage means includes:
a deflection support base;
a deflection support shaft pivotally mounted on said base for movement about a deflection axis, said deflection member rotatably journalled on said shaft; and,
torsion spring means operatively connecting said deflection member and said support shaft for allowing limited relative movement between said shaft and member while maintaining substantially constant pressure on the breast portion of the poultry, said deflector drive means selectively rotating said support shaft.

21. Poultry eviscerating apparatus for removing viscera from poultry having an access opening to the body cavity thereof at its vent including:
conveying means for successively moving said poultry along a prescribed path in a head lowermost position, said conveying means including a plurality of shackles flexibly suspended, each of said shackles having a pair of spaced apart hock engaging members for supporting the poultry by its hocks;
a base frame;
a carriage subassembly adjustably mounted on said base frame;
a plurality of sprockets rotatably journalled in said carriage subassembly;
an endless chain extending around said sprockets in mesh therewith, said chain having a forward flight generally parallel to and spaced below said prescribed path a predetermined distance;
a plurality of holding members mounted on said chain in spaced apart positions, each of said holding members vertically aligned with a shackle of said conveying means when said holding member passes along said forward flight, each of said holding members comprising a body oriented at a first prescribed angle with respect to the horizontal, a U-shaped yoke including a pair of spaced apart, generally parallel legs and a bight joining said legs, the ends of said legs opposite said bight connected to said body so that said legs define a second prescribed angle with respect to said body, said bight defining a third prescribed angle with respect to said legs so that said legs selectively engage said poultry carried by said hock engaging members at the joints between the legs and body of the poultry in opposition to said hock engaging members to support said poultry between said hock engaging members and said positioning means so that the access opening is located in a relatively fixed plane for limited movement of the access opening within the plane generally transversely of said prescribed path while the breast portion of said poultry is allowed to move with respect to said plane;
positioning means for selectively varying the spacing between said hock engaging members and said holding members;
support table means carried by said base frame for reciprocal movement along a positioning path generally parallel to said prescribed path;
undercarriage frame means pivotally mounted on said support table means about a second axis generally parallel to said prescribed path;
tilt means interconnecting said support table means and said undercarriage frame means for selectively moving said undercarriage frame means with respect to said support table means about said second axis generally parallel to said prescribed axis;
mounting shaft means carried by said undercarriage frame means for movement with said undercarriage means along said positioning path and said second axis, and for movement with respect to said undercarriage frame means along an eviscerating path generally normal to said second axis and said prescribed path;
shaft drive means for selectively reciprocating said mounting shaft means along said eviscerating path;
eviscerating tool means for insertion into the body cavity of the poultry through the access opening to remove the viscera therefrom, said eviscerating tool means pivotally mounted on said mounting shaft means for pivotal movement about a first prescribed axis generally parallel to said prescribed path;
drive rod means operatively connected to said eviscerating tool means for pivoting said eviscerating tool means about said first prescribed axis;
drive member means;
connector means resiliently connecting said drive rod means to said drive member means;
tool drive means operatively connected to said drive member means for selectively moving said drive member means to cause said eviscerating tool means to pivot about said first prescribed axis independently of the movement of said mounting shaft means, said connector means allowing relative pivotal movement of said eviscerating tool means about said first axis independently of said tool drive means while causing said eviscerating tool means to exert a substantially constant force on the poultry;
first stop means for selectively limiting the pivotal movement of said eviscerating tool means about said first prescribed axis in a first direction, said first stop means having an intermediate position for limiting the pivotal movement of said eviscerating tool means at a first position, and said first stop means having a final position for limiting the pivotal movement of said eviscerating tool means at a second position;
stop drive means operatively connected to said first stop means for selectively moving said first stop means between said intermediate position and said final position;
second stop means for selectively limiting the pivotal movement of said eviscerating tool means about said first prescribed axis in a second direction opposite to said first direction;

a deflection support base; a deflection support shaft pivotally mounted on said base for movement about a deflection axis generally parallel to said prescribed path;

a plurality of deflector members rotatably mounted on said deflection support shaft, each of said deflector members having a flexible breast engaging section;

torsion spring means operatively connecting said deflection members and said support shaft for allowing limited relative movement between said shaft and members while maintaining substantially constant pressure on the breast portion of the poultry, said deflector drive means selectively rotating said support shaft;

deflector drive means for selectively moving said deflection member means into engagement with the breast portion of the poultry synchronously with the insertion of said eviscerating tool means into the body cavity of the poultry; and, interconnect means for synchronizing the movement of said holding members, said eviscerating tool means, and said deflector members with said shackles.

22. A method of processing poultry comprising the steps of:

supporting the poultry by its hocks and through the joints between its legs and body so that a preformed access opening at its vent is located in a substantially fixed plane and the breast portion of the poultry is resiliently supported through its bone and muscle structure so that it is movable relative to the fixed plane; and, moving an eviscerating tool through the access opening into the body cavity of the poultry to withdraw the viscera therefrom.

23. The method of claim 22 further including the step of pressing against the breast portion of the poultry to force the keel bone into engagement with the tool while the tool is being inserted into the body cavity.

24. The method of claim 22 wherein the step of supporting the poultry further includes allowing the access opening to be moved about a fixed plane.

25. The method of claim 24 wherein the step of moving the eviscerating tool through the access opening includes forcing the tip of the tool against the breastbone while the tool is being inserted into the body cavity and forcing the tool against the backbone while the tool is being withdrawn from the body cavity.

* * * * *